(No Model.)
S. BRADLEY.
COUPLING FOR TUBULAR LIGHTNING RODS.
No. 303,488. Patented Aug. 12, 1884.
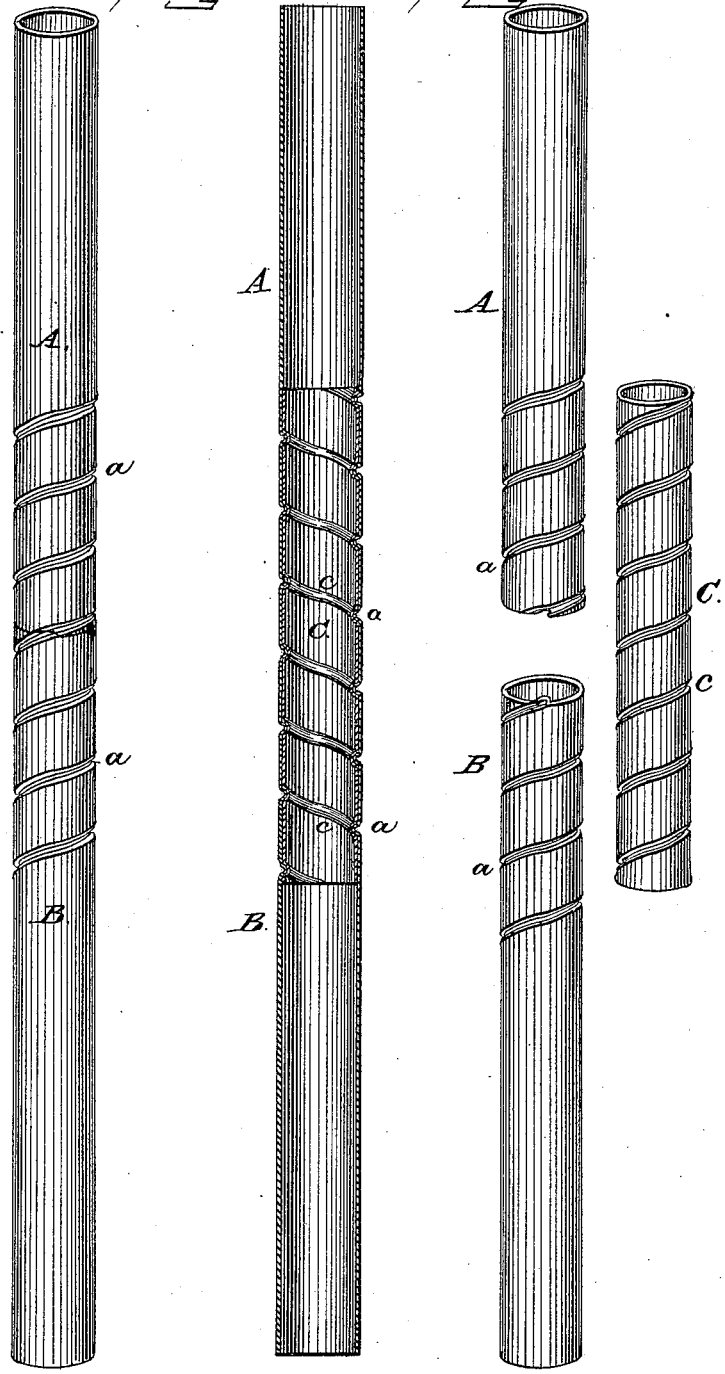
WITNESSES:
Fred. G. Dieterich
N. J. King
INVENTOR.
Sylvester Bradley
DeWitt C. Allen
ATTORNEY

UNITED STATES PATENT OFFICE.

SYLVESTER BRADLEY, OF BLOOMINGTON, ILLINOIS.

COUPLING FOR TUBULAR LIGHTNING-RODS.

SPECIFICATION forming part of Letters Patent No. 303,488, dated August 12, 1884.

Application filed February 19, 1884. (No model.)

*To all whom it may concern:*

Be it known that I, SYLVESTER BRADLEY, a citizen of the United States, residing at Bloomington, in the county of McLean and State of Illinois, have invented certain new and useful Improvements in Connections or Couplings for Tubular Lightning-Rods; and I do hereby declare the following to be a full, clear, and exact description of the invention, such as will enable others skilled in the art to which it appertains to make and use the same.

This invention relates to certain new and useful improvements in the class of tubular lightning-rod connections or couplings, having for its object the production of a cheap, perfect, and tight joint at the point of contact of the tubular sections forming the rod; and to this end the invention consists in novel features of construction and combination and arrangement of parts, all as will be hereinafter fully described, and set forth in the claims hereto annexed.

Referring to the accompanying drawings, Figure 1 represents a view in perspective of the improved connection or coupling. Fig. 2, a longitudinal section; Fig. 3, detached views of the parts necessary to form two sections of a rod.

In the drawings, A and B represent two sections of a tubular lightning-rod of equal diameter, and C an inner connecting-section of smaller diameter, adapted to closely fit within the outer sections, A and B. The tubular sections A and B have formed at their meeting or contact ends, and a short distance therefrom, a spiral groove, *a*, which, when the ends of said sections are brought closely in contact with each other, will form one continuous spiral groove. The inner connecting tubular section, C, is of a length corresponding to the continuous spiral groove on the ends of the two sections, A and B, and has a similar spiral groove, *c*, also corresponding with that of the sections A and B.

The three sections A, B, and C, when formed with the spiral grooves, as shown and described, are easily, quickly, and readily coupled in the following manner: The inner tubular connecting-section, C, is screwed into one of the outer sections until it strikes the end of the spiral groove formed thereon, after which the other outer section is screwed onto the projecting portion of the inner tubular section, C, until the two outer tubular sections are joined perfectly together, the inner sections fitting closely to the outer sections, making the connection firm and tight.

By the above-described construction of the connection or coupling no copper is cut away, so that the rod is not in any way weakened, while leaving a perfect free and inner open joint necessary in tubular lightning-rods. The spiral grooves being easily and readily pressed in the coupling-sections, materially lessens the cost of construction in this class of lightning-rods, while, as before stated, a perfect and tight joint is formed in connecting the main sections of the rod.

It will be observed that by my improved construction the three parts A, B, and C are always ready for coupling, thereby obviating tools to form the connections when the sections are desired to be connected in putting up a lightning-rod.

Having thus described my invention, what I claim as new, and desire to secure by Letters Patent, is—

In a connection or coupling for tubular lightning-rods, the combination of the outer tubular sections, A and B, having spiral grooves formed or pressed on their inner contact or meeting ends, and an inner connecting tubular section, C, having a similar spiral groove adapted to draw the adjacent ends of the sections A and B in close contact with each other, substantially in the manner as and for the purpose herein shown and described.

In testimony whereof I affix my signature in presence of two witnesses.

SYLVESTER BRADLEY.

Witnesses;
 THOS. SLADE,
 J. W. DAVES.